United States Patent [19]

Tylisz et al.

[11] Patent Number: 5,209,166
[45] Date of Patent: May 11, 1993

[54] AERODYNAMIC SELF CLEANING HOPPER CAR

[75] Inventors: Eugene R. Tylisz, Michigan City; Phillip G. Przybylinski, Schererville, both of Ind.

[73] Assignee: Trinity Industries, Inc., Dallas, Tex.

[21] Appl. No.: 715,726

[22] Filed: Jun. 17, 1991

Related U.S. Application Data

[63] Continuation of Ser. No. 446,042, Dec. 5, 1989, abandoned.

[51] Int. Cl.⁵ ............................................. B61D 17/02
[52] U.S. Cl. ...................................... 105/1.1; 105/248; 105/410
[58] Field of Search ................. 105/1.1, 1.2, 247, 248, 105/404, 406.1, 409, 410

[56] References Cited

U.S. PATENT DOCUMENTS

| | | | |
|---|---|---|---|
| D. 201,478 | 6/1965 | Larssen et al. | 105/248 X |
| 3,374,528 | 3/1968 | Bowcutt et al. | 29/471.1 |
| 3,427,994 | 2/1969 | Keene | 105/248 |
| 3,470,829 | 10/1969 | Szala | 105/248 |
| 3,515,051 | 6/1970 | Pulcrano | 105/247 X |
| 3,543,692 | 12/1970 | Stark | 105/248 |
| 3,603,439 | 9/1971 | Pietsch | 193/25 R |
| 4,348,962 | 9/1982 | Smith | 105/246 |
| 4,362,111 | 12/1982 | Stark et al | 105/247 |
| 4,444,123 | 4/1984 | Smith et al. | 105/248 X |
| 4,497,258 | 2/1985 | Ruhmann et al. | 105/448 X |
| 4,518,188 | 5/1985 | Witten | 105/1.1 X |
| 4,738,203 | 4/1988 | Gielow et al. | 105/1.1 |
| 4,909,154 | 3/1990 | Walker et al. | 105/1.1 |

Primary Examiner—Robert J. Oberleitner
Assistant Examiner—S. Joseph Morano

[57] ABSTRACT

A curved sided aerodynamic self clearing hopper car uses the curved sides, end skirts and top chord and side sills for improved strength and reduced aerodynamic drag.

3 Claims, 2 Drawing Sheets

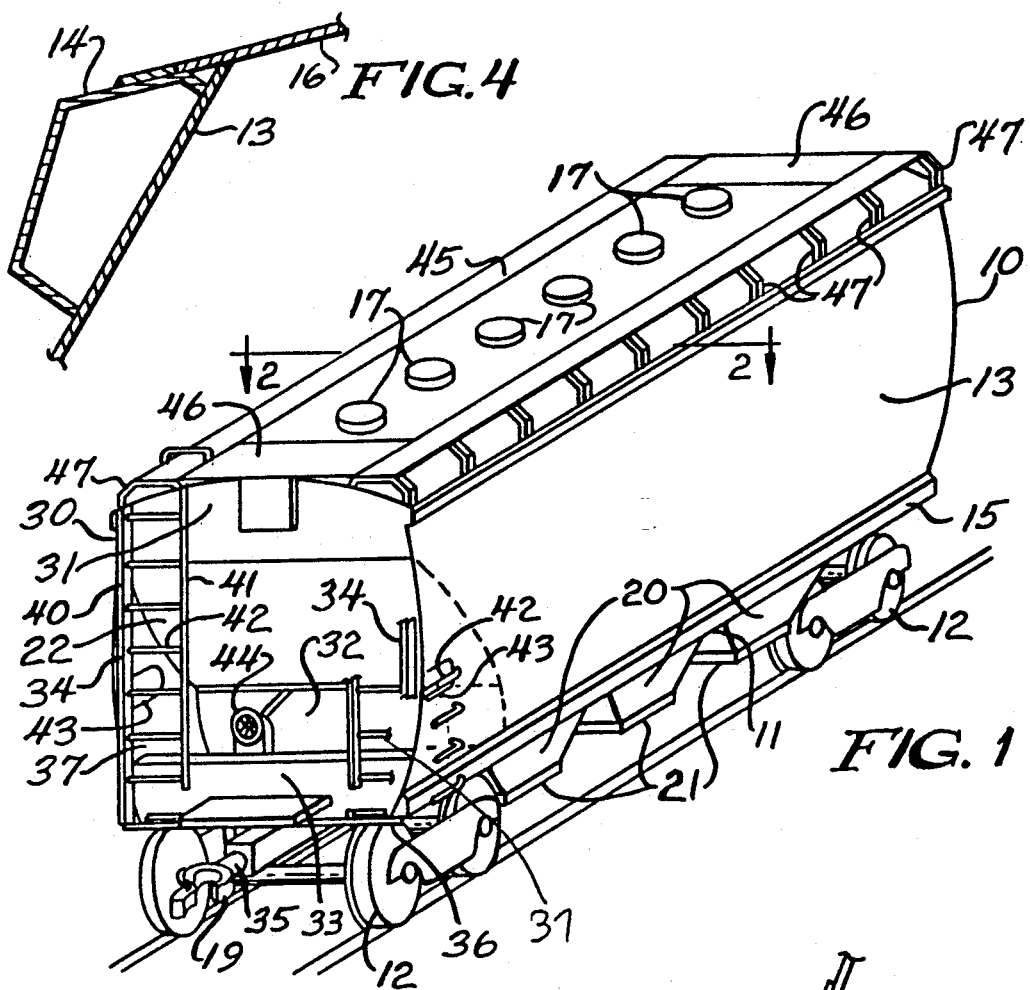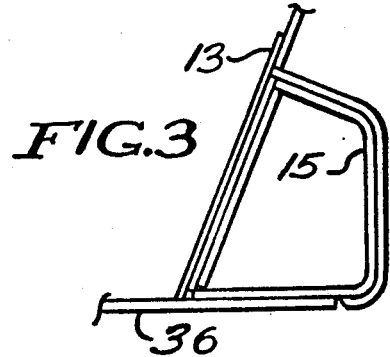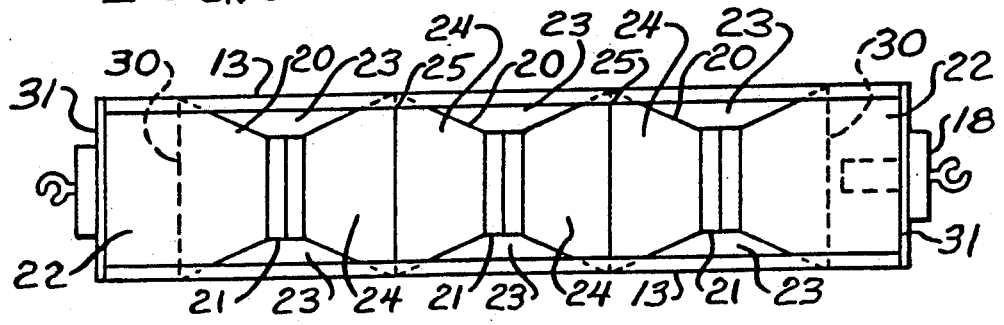

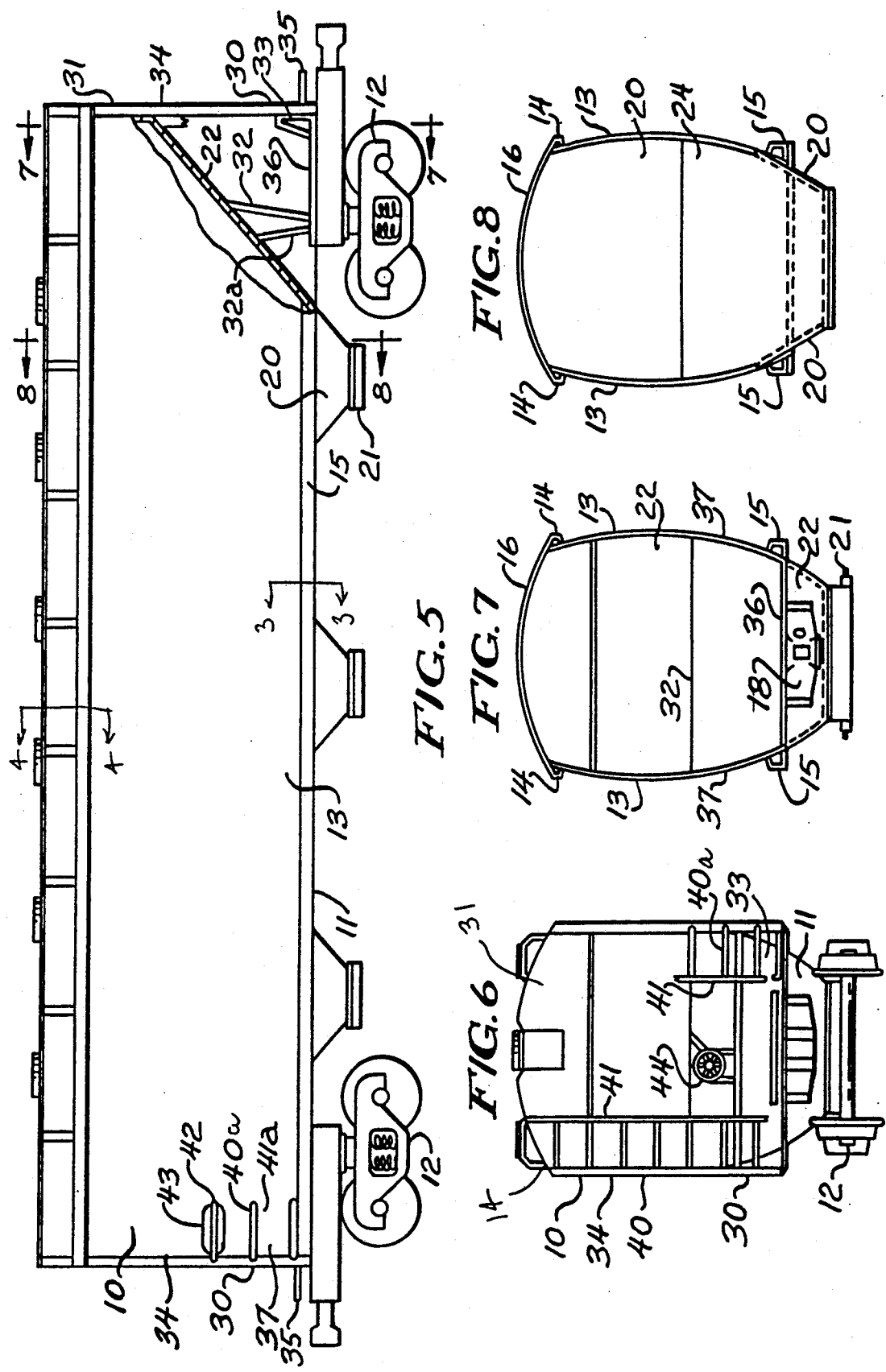

5,209,166

AERODYNAMIC SELF CLEANING HOPPER CAR

This is a continuation of co-pending application Ser. No. 446,042 filed Dec. 5, 1989, abandoned.

SUMMARY OF THE INVENTION

This invention provides complementary improvements in car aerodynamics, strength, weight and stability through the use of a continuous side sheet and sill structure. In particular the side sheet is curved inwardly at both the top and bottom edges reinforced by efficient top sill or side chord structures, side sill structures and the mounting of the hopper slope plates, further extending the curved side sheets completely to the end of the car. Necessary structures such as running boards and ladders are accommodated with minimum interruption of air flow and maintenance of the continuity of the side sheet and top cover structure.

In particular, aerodynamics are enhanced by presenting an outer surface with a more laminar longitudinal flow. This results from a reduction in drag from exterior reinforcing structures such as vertical stringers on flat-sided prior art cars. Laminar flow is further enhanced by the sills and chord which tend to direct or channel a portion of air flow from cross winds to a more longitudinal flow commensurate with the forward motion of a line or string of cars.

Turbulence is further reduced by the substantially smooth side sheets. This is accomplished in the preferred embodiment by welding and minimizing external bracing, however other methods such as flush riveting or bonded composites could be used. Turbulence induced by cross winds is reduced through the curvature of the side sheets. To the extent flow is not directed longitudinally through the use of appropriately contoured chords and sills in conjunction with the curved sides providing a non acute angle and relatively smooth transition. An additional reduction in turbulence results from optimizing placement of attached structure such as ladders, corner posts and running boards can be mounted so as to present minimum frontal area and the area exposed lies closer to or within the area of laminar flow. Turbulence is further reduced by the channeling effect of the side sill because the underframe, hopper discharge mechanisms and the like provide a greater drag than the smooth side.

Drag is also reduced by virtue of the fact that a car with curved sides and top or roof has a smaller wetted surface than a square or rectangular section car of the same maximum dimensions.

The strength of the car is increased by this configuration due to the curved section in the sides and roof providing increased rigidity to forces imposed by transit in directions other than perpendicular to a flat-side plate in a prior art car. Further the inward sloping or curving permits the placement of si and chord elements of larger section further enhancing rigidity. The extended side sheet or skirt portion covering the end of the car increases the strength of the end structure complementing the strength in the center sill, shear plate, bolster and corner post structure. Increased strength permits reduced weight and elimination of stringers and other external bracing structures contributing to reduced overall weight and increased efficiency.

Vehicle stability is enhanced about the longitudinal axis of the car by virtue of the fact that the inwardly sloping or curved top portions of the side sheets reduce the width at the top and increases roof sheet stability and the curved roof reduces height at the top edges. This tends to lower the mass of the loads to a greater degree than a square or rectangular section car with the same maximum dimensions.

Extending the side sheets to the end corner post adds load transfer capacity of coupler loads to the shear plate and thus to the side structure including the side sheets ordinarily a problem exists in the area of attachment of the shear plate to the side wall. The instant invention accommodates additional connections of the shear plate to the side sheets.

In the instant design a radiused transition on the shear plate where it meets the side sill is provided to reduce stress concentrations.

DESCRIPTION OF RELEVANT ART

Johnson, U.S. Pat. No. 3,606,841 shows a covered hopper car specifically being addressed to the end construction. An embodiment of Johnson does include the extended side sheets or skirts, however, in a flat-sided car, additional strengthening members in the form of external vertical stringers are needed. Neither the aerodynamic nor efficient strengthening of the present design are taught by Johnson. Przybylinski, U.S. Pat. No. 3,769,918 specifically addresses the use of extended side skirts comprising a portion of the side sheet. This reinforcing structure works in conjunction with a bolster web beam to strengthen the end structure. An alternative to this skirt and web bolster structure is shown in Spence, U.S. Pat. No. 3,557,713 showing an alternative to the web beam structure specifically a faceted bolster web and gull wing shear plate design. A stub center sill is further shown in Przybylinski, U.S. Pat. No. 3,769,918. These patents also show the external stiffening by vertical stringers and while U.S. Pat. No. 3,557,713 eliminates corner posts and neither uses the fully extended skirt narrowing the gap between cars.

BRIEF DESCRIPTION OF THE DRAWINGS

FIG. 1 is a perspective view of the invention.

FIG. 2 is a top sectional view taken along lines 2—2 of FIG. 1.

FIG. 3 is an enlarged sectional view of the side sill taken along lines 3—3 of FIG. 5.

FIG. 4 is an enlarged sectional view of the top chord structure taken along lines 4—4 of FIG. 5.

FIG. 5 is a partially cut away side view.

FIG. 6 is an end elevational view.

FIG. 7 is a sectional view with the end support structure removed taken along lines 8—8 of FIG. 5.

FIG. 8 is a sectional view near the apex of a hopper.

DETAILED DESCRIPTION OF THE DRAWINGS

FIG. 1 is a perspective view of an aerodynamic self clearing hopper car with the right corner post and appurtenant ladder structures cut away. The self clearing hopper car 10 is carried on an integral underframe assembly 11 supported by truck assemblies 12. The car body is composed of side sheets 13 with chords 14 at the upper portions and side sills 15 at the bottom portion. As seen in FIGS. 1, 7, and 8, a curved roof sheet 16 extends across and completely covers the top of the car from one top chord associated with one side sheet 13 to the opposite top chord 14. Hatches 17 are provided in the roof or cover to permit loading and inspection of materials. In the preferred embodiment a stub center sill assembly 18 supports a standard coupler 19 mechanism for joining a complementary car as illustrated in FIG. 8.

As best seen in FIGS. 2 and 5, a plurality of hoppers 20 is shown in the preferred embodiment being adapted with bottom discharge assemblies 21. Other configurations of hoppers 20 with one or more hoppers may be fabricated without departing from the invention. A major factor in self clearing hoppers is the presence of suitably sloped sheets and in particular an end slope sheet of approximately thirty five to forty five degrees slope for most applications. Appropriate arrangements of slope and hopper discharge assemblies of various kinds are known in the art and described in standard references therein.

Referring to FIGS. 1, 2, and 5, the preferred embodiment incorporates hoppers with end slope sheets 22 sloping inwardly from the ends of the car and side slope sheets 23 sloping inwardly from the sides of the car. Joints between the respective slope sheets are bonded or joined as by welding, angled brackets separately fastened or the like. Welding is used in the preferred embodiment. The end structure 30 is indicated generally and comprises a vertical end plate 31, joined to the end slope sheet 22 near the top of the car. Moments and axial forces or load from coupling forces and other forces imparted by transportation are distributed through the various unitized elements of the end structure 30. A bolster web 32 extends vertically downwardly from its intersection with the end slope sheet 22. The holster web 32 joins a double vertical plate, the side sheets 13, the shear plate 36 and the center sill stub assembly 18. Additional strengthening of the and structure is accomplished by vertical corner posts 34. In FIG. 1 the right corner post being cut away to show the curvature of the end edge of the side sheet 13. As illustrated in FIG. 5 end sill 33 extends transversally between the side sills 15 and corner posts 34, on either side of the car in this embodiment extending vertically a substantial distance greater than the vertical dimension of the side sill.

In prior art embodiments, the side sheet generally terminates at its junction with the upper portion of the end slope sheet and bolster web. In this embodiment as shown in FIGS. 1, 5, and 7, the sheet 13 extends the full length of the car and the full height of the car, thereby forming a skirt 37 which provides fairing for the various appliances and mechanisms which comprise a portion of the end structure 30. The skirt 37 closes the generally triangular or trapezoidal gap created by the end sheets 22 at the end of each car so that a more laminar flow of air along the car is promoted and further that a more laminar flow along a line of a plurality of cars of like configuration is further promoted. Corner post 84 is partially faired by the skirt 37, and the corner post 34 extending from the side sill 15 to the top chord 14 (FIG. 6) intersecting the curvature of the edge of the side sheet 13 near a point tangent thereto near the point of maximum width of the car. The use of a corner post 34 enables the use thereof for supporting a ladder 40 at the end of the car, the rungs or rails thereof extending horizontally from the corner post 34 to a stile 41. Minimal total frontal area from corner post 34 is therefore accomplished. A shorter ladder is on the opposite corner post.

In FIGS. 1 and 5, side ladders 40a with rungs 42a extending longitudinally from the corner post 34 have the remote end affixed to the side sheet 13. This provides a side ladder Without the aerodynamic interference of a full vertical stile on the side of the car. The intrusion into the slip stream of the side ladder is reduced to the point where at the point of maximum width of the car, hand clearance for the rung 42 is provided by an aperture 43 relieved in the skirt 37. Suitable arrangement for a standard hand brake 44 is also provided on the end structure 34.

Referring to FIG. 1 running board mounts 47 are affixed to the roof sheet 16. One end of the mount 47 joins said sheet 16 near its joint with the chord 14. The running board mounts 47 used provide for a level longitudinal running board 45 spaced above the curved roof sheet 16. Transverse running board 46 is mounted therebetween. This arrangement of running boards provides workers with both means to move from one end of the car to the other and also means for access to hatches 17 and various apparatus used for loading material therethrough.

FIG. 2 is a top sectional view taken at line 2—2 of FIG. 1 substantially showing the car with the top removed. In this embodiment three hoppers 20 are shown, however more or fewer could be used provided the goals of the aerodynamic self clearing hopper are met. The discharge mechanism assemblies 21 are associated with the interior portions of each hopper 20 at the bottom thereof. End slope sheets 22 slope inwardly and downwardly from end sheets 31 to the discharge assembly 21. Dividing each hopper are divider or partition sheets 25 which may comprise either full or partial height bulkhead structures or may simply perform reinforcing gusset functions extending partially from the side sheets 13 into the space between hoppers 20.

Interior slope sheets 24 slope downward from sheets 25 to the discharge assembly 21 of each hopper. Interior hoppers without end slope sheets are defined by a pair of interior slope sheets 24. In the preferred embodiment, side slope sheets 23 are associated in an opposed pair with each hopper 20, thus each hopper comprises for sheets sloping so as to downwardly converge both longitudinally and transversely. It will be noted that a slightly elliptical plan-form is shown because of the joint between the straight sheets 22 and 24 and the curved sides 13.

FIG. 3 is an enlarged sectional view of side sill 15 showing the joint with shear plate 36 and side sheet 13 which is welded in the preferred embodiment. The upper surface or facet is normal to the side sheet 13.

FIG. 4 is an enlarged sectional view of chord 14 showing its intersection at the top of side sheet 13 joining side sheet 13 with roof sheet 16. The profile of chord 14 is apparent in this view where the lower surface or facet is normal to the side sheet 13.

FIG. 5 is a partially cut away elevational view of a self clearing hopper car 10 in which the side sheet 13, chord 14 and sill 15 are visible. In addition to the semi-monocoque curved side wall assembly, additional support is provided by the underframe assembly 11 and the end structures 30 supporting the vehicle from truck assemblies 12. The skirt 37 extends the side sheet 13, lengthwise of the car and the full height of the car to corner posts 34. In FIG. 5 at one end the skirt has been cut away showing the end slope sheet 22, extending in a line from end plate 31 to the bottom of hopper 20 at the hopper discharge assembly 21. Bolster web 32 extends from sheet 22 vertically downwardly to shear plate 36. Plate 36 extends endwardly to end sill 33. Bolster web 32 extends laterally between load spreader plates (32a) at each side which are wide at the intersection of the side sheet 13 and the end slope sheet 22 to distribute the load into a large area of side sheet and avoid a stress concentration at the top of the bolster web 32.

Also visible in this view are corner post 34 tying chord 14 and sill 15 together and end platforms 35 providing worker access to requisite appliances.

Side ladder 41a extends upwardly, a portion of the height of the car on both sides. Aperture 43 in skirt 37 provides hand clearance where a rung 42 is placed close to the widest point of curved side sheet 13.

FIG. 6 is an end view of the aerodynamic self clearing hopper car. Portions of underframe 11 and end structure 3 support the car body. Ladder 40 on the left side extends the full height being supported by corner post 34 and ladder stile 41. The right hand side ladder 40a extends only partially the height of the car to provide access to the open area defined by the end structure 30 below end slope sheet 22. The bottom portions of ladder stiles 41 are mounted on end sill 33.

FIG. 7 is a sectional view taken at line 7—7 of FIG. 5 showing specific sectional arrangements of curved side sheets 13, and curved roof or top sheet 16 at the intersection therebetween a chord 14. At the point where sheet 13 extends downwardly forming skirt 37 the lower portion of the sheet and skirt is joined with side sill 15 and shear plate 36 forming a unitized end structure. End slope sheet 22 extends angularly downwardly and appears both above and extending below bolster web or standard 32. In FIG. 7 center sill stub assembly 18 is visible, the truck shown in the preceding figure has been removed for clarity and hopper discharge assembly 21 is visible in this view.

FIG. 8 is a sectional view taken at line 8—8 of FIG. 5 substantially showing the interior of a hopper 20. The continual section of exterior side 13 and top 16 sheets joined at chord 14 are shown and the downward extension of side sheets 13 between chord 14 and sill 15. Within this sectional view of hopper 20, interior slope plate 24 is visible as are hopper side slope sheets 20 and hopper gate is not shown.

In accordance with my invention, I claim:

1. An aerodynamic self clearing hopper car body supported by an undercarriage, comprising:
   a roof sheet extending the length of the body;
   end structures at each end of the vehicle body vertically extending from roof to undercarriage;
   side sills extending longitudinally between the end structures;
   chords at the edges of the roof, side sheets extending longitudinally between the end structures and extending vertically between the chords and side sills;
   said side sheets having a contour being inwardly curved along the top and bottom lengths thereof and having intermediate lengths extending laterally outwardly so that the maximum width extends at least as far as the point of tangency of a vertical line from the chord to the side will and enclosing said end structures for reduced aerodynamic drag,
   said side sheets having smooth end extensions conforming to said contour of said side sheets and forming smooth, uninterrupted exterior side wall surfaces between the ends of the body,
   a vertical end sheet extending between the curved side walls and having a bottom edge;
   an end slope sheet sloping downwardly and away from the bottom edge of the end sheet and extending transversely between the curved side walls;
   a vertical bolster web extending downwardly from a line on said end slope sheet intermediate the bottom edge of the end sheet and the bottom of the curved side sheets;
   corner posts extending vertically between chord and sill, said corner post intersecting the side sheet curve with the point of tangency at the maximum width of the car;
   a shear plate extending horizontally and outwardly from the web to corner post; and
   an end sill extending from side wall to side wall at the corner posts and extending upwardly from the shear plate.

2. The invention according to claim 1 and said side walls further comprising:
   a substantially smooth surface extending the length of the car being unbroken by external structural members between said corner posts;
   said chord forming a beveled box section at the top edge of the curved side wall so as to present a lower surface; and
   a top surface parallel to said roof sheet;
   said sill forming a beveled box section at the bottom edge of the curved side wall so to present upper opposing surfaces and a bottom portion affixed to said shear plate.

3. The invention according to claim 2 and
   said car comprising one in a series of cars of like configuration;
   said side walls enhancing laminar flow of air along the series of cars.

* * * * *